United States Patent
Lee et al.

(10) Patent No.: US 11,515,770 B2
(45) Date of Patent: Nov. 29, 2022

(54) DEVICE FOR MANUFACTURING ROTOR CORE AND METHOD FOR MANUFACTURING ROTOR CORE

(71) Applicant: FANUC CORPORATION, Yamanashi (JP)

(72) Inventors: SeungJun Lee, Yamanashi (JP); Hidetoshi Uematsu, Yamanashi (JP); Makoto Funakubo, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 417 days.

(21) Appl. No.: 16/786,819

(22) Filed: Feb. 10, 2020

(65) Prior Publication Data
US 2020/0259402 A1 Aug. 13, 2020

(30) Foreign Application Priority Data
Feb. 12, 2019 (JP) .............................. JP2019-022592

(51) Int. Cl.
*H02K 15/12* (2006.01)
*H02K 1/276* (2022.01)
(Continued)

(52) U.S. Cl.
CPC ....... *H02K 15/12* (2013.01); *B29C 45/14467* (2013.01); *B29C 45/1742* (2013.01);
(Continued)

(58) Field of Classification Search
None
See application file for complete search history.

(56) References Cited

FOREIGN PATENT DOCUMENTS

| JP | WO 2012026003 A1 | * | 3/2012 | ............... H02K 1/27 |
| JP | 2012223024 A | * | 11/2012 | ............... H02K 1/27 |
| JP | WO2016/147211 A1 | | 12/2017 | |

OTHER PUBLICATIONS

English translation of WO 2012026003A1 (Year: 2012).*
English translation of JP 2012223024A (Year: 2012).*

* cited by examiner

*Primary Examiner* — Timothy Kennedy
*Assistant Examiner* — Olukorede Esan
(74) *Attorney, Agent, or Firm* — Studebaker & Brackett PC

(57) ABSTRACT

Provided is a manufacturing device for a rotor core and a manufacturing method for a rotor core in which it is possible to suitably fit a columnar core rod into a center hole of a laminated iron core, when fitting and installing the laminated iron core into a fitting recess of a first mold. A device for manufacturing a rotor core includes: a first mold; a second mold that engages with the first mold and clamps and seals the laminated iron core together with the first mold; a resin injection unit that is provided to the second mold and injects a resin material in the magnet insertion hole by using a molding machine; and a guide plate that has a through hole into which the core rod is inserted and is mounted at one end of the laminated iron core in such a manner that the through hole is in communication with the center hole of the laminated iron core, in which the guide plate has an opening diameter of the through hole on one surface side of one end side of the laminated iron core that is substantially the same as an opening diameter of the center hole, and an opening diameter of the through hole on the other side on the side of the first mold is larger than an opening diameter on the one surface side.

3 Claims, 4 Drawing Sheets

(51) Int. Cl.
*H02K 1/28* (2006.01)
*H02K 15/03* (2006.01)
*B29C 45/17* (2006.01)
*B29C 45/14* (2006.01)
*B29L 31/00* (2006.01)
*B29K 705/12* (2006.01)

(52) U.S. Cl.
CPC .............. *H02K 1/276* (2013.01); *H02K 1/28* (2013.01); *H02K 15/03* (2013.01); *B29K 2705/12* (2013.01); *B29K 2995/0008* (2013.01); *B29L 2031/7498* (2013.01)

DEVICE FOR MANUFACTURING ROTOR CORE AND METHOD FOR MANUFACTURING ROTOR CORE

This application is based on and claims the benefit of priority from Japanese Patent Application. No. 2019-022592, filed on 12 Feb. 2019, the content of which is incorporated herein by reference.

BACKGROUND OF THE INVENTION

Field of the Invention

The present invention relates to a device for manufacturing a rotor core and a method for manufacturing a rotor core.

Related Art

For example, as shown in FIG. 1, the IPM type rotor core (interior permanent type rotor core) 1 is configured to include: a laminated iron core 2 in which a plurality of core members (thin plate-shaped members) formed by punching an electromagnetic steel sheet is laminated, permanent magnets 3 that are each inserted into and accommodated in a magnet insertion hole 2c formed to penetrate from one end 2a to the other end 2b in an axis line O1 direction of the laminated iron core 2, and a resin material 4 for embedding and fixing the permanent magnets 3 by injecting the resin material 4 into the magnet insertion hole 2c.

For example, as shown in FIG. 2, the SPM-type rotor core (surface permanent type rotor core) 5 is configured to include a laminated iron core 2, permanent magnets 3 which are arranged at equal intervals in the circumferential direction on the outer peripheral surface side of the laminated iron core 2, a cylindrical exterior member 6 which surrounds and covers the laminated iron core 2 with the permanent magnets 3, and a resin material 4 for embedding and fixing the permanent magnets 3 by injecting the resin material 4 between the exterior member J and the laminated iron core 2.

Furthermore, a center hole (shaft hole) 2d that is formed to penetrate from one end 2a to the other end 2b on its axis line O1 and is used for fitting the shaft is provided in the laminated iron core 2.

On the other hand, for example, as shown in FIG. 4, a device for manufacturing the rotor cores 1 and 5 is configured to include: a first mold 7 having a fitting recess 7a that fits and holds the laminated iron core 2 mounted by inserting the permanent magnet 3 into the magnet insertion hole 2c (or a laminated iron core 5 to which the permanent magnet 3 and the exterior member 6 are mounted) in the axis line O1; a second mold 8 that is engaged with the first mold 7 and clamps/seals the laminated iron core 2 within a mold cavity with the first mold 7; and a resin injection unit 9 that is provided in the second mold 8 (or the first mold 7) and injects the resin material 4 in the magnet insertion hole 2c of the laminated iron core 2 within the mold cavity (or between the exterior member 6 and the laminated iron core 2) (for example, refer to Patent Document 1). When fitting the laminated iron core 2 in the fitting recess 7a, the first mold 7 is provided with a core rod 10 integrally for positioning and holding by being fit in the center hole (shaft hole) 2d.

When manufacturing the rotor cores 1 and 5, as shown in FIGS. 4 and 5, after clamping the first mold 7 and the second mold 8 and sealing the laminated iron core 2, as shown in FIG. 6, the resin material 4 is injected into the magnet insertion hole 2c from the resin injection unit 9 (or between the exterior member 6 and the laminated iron core 2) by using an injection molding machine. As shown in FIG. 7, the molds 7 and 8 are opened at the appropriate timing, thereby removing the rotor core 1 (5) by form removal. The rotor core 1 (5) in which the permanent magnet 3 is embedded and fixed by the resin material 4 is thereby manufactured.

Patent Document 1: Re-publication of WO2016/147211

SUMMARY OF THE INVENTION

However, in the manufacturing device for the conventional rotor cores 1 and 5 the manufacturing method for the rotor cores), when fitting and installing the laminated iron core 2 in the fitting recess 7a of the first mold 7, it is difficult for the columnar core rod 10 to be fit into the center hole 2d of the laminated iron core 2 having substantially the same shape, and in some cases, the one end 2a of the laminated iron core 2 abuts against the core rod 10, possibly causing manufacturing defects to arise (refer to FIG. 4).

An aspect of a device for manufacturing a rotor core of the present disclosure is a device for manufacturing a rotor core, the device including: a first mold including: a fitting recess that fits and holds a laminated iron core in which a magnet is inserted into a magnet insertion hole, or a laminated iron core in which a magnet and an exterior member are mounted on an outer circumferential side, and a columnar core rod that is fit into a center hole that is formed to penetrate in an axis line direction of the laminated iron core; a second mold that engages with the first mold and clamps and seals the laminated iron core together with the first mold; a resin injection unit that is provided to the first mold or the second mold and injects a resin material in the magnet insertion hole or between the exterior member and the laminated iron core by using a molding machine; and a guide plate that has a through hole into which the core rod is inserted with an axis line as a center and is detachably mounted at one end in an axis line direction on a side of the first mold of the laminated iron core in such a manner that the through hole is in communication with the center hole, in which the guide plate has an opening diameter of the through hole on one surface side of one end side of the laminated iron core that is substantially the same as an opening diameter of the center hole, and an opening diameter of the through hole on the other side on the side of the first mold is larger than an opening diameter on the one surface side.

An aspect of a method for manufacturing a rotor core of the present disclosure is a method for manufacturing a rotor core, the method including: a guide plate mounting step of detachably mounting a guide plate having a through hole, with an axis line as a center, at one end in an axis line direction of a laminated iron core in which a magnet is inserted into a magnet insertion hole or a laminated iron core in which a magnet and an exterior member are mounted on an outer circumferential side in such a manner that the through hole is in communication with a center hole that is formed to penetrate in an axis line direction of the laminated iron core; a first mold mounting step of inserting a columnar rod-shaped core rod provided to the first mold into a center hole of the laminated iron core from the through hole of the guide plate in a fitting recess of the first mold, and fitting and arranging the laminated iron core; a second mold mounting step of engaging the second mold with the first mold, and clamping and sealing the laminated iron core together with the first mold; and a resin injecting step of injecting a resin material into the magnet insertion hole or between the exterior member and the laminated iron core, through a resin injection unit provided to the first mold or the second mold, in which the guide plate has an opening diameter of the through hole on one surface side of one end side of the laminated iron core that is substantially the same as an opening diameter of the center hole, and an opening diameter of the through hole on the other side on a side of the first mold is larger than an opening diameter on the one surface side, and in the first mold mounting step, the core rod is inserted into the through hole while guided by a guide surface of an inner surface of the through hole.

In the aspect described above, in a state in which the guide plate that has an opening diameter of the through hole on one surface side of one end side of the laminated iron core that is substantially the same as an opening diameter of the center hole, and in which an opening diameter of the through hole on the other side on the side of the first mold is larger than an opening diameter on the one surface side is mounted to the one end of the first mold side of the laminated iron core, the laminated iron core is fit into the fitting recess of the first mold.

With such a configuration, the core rod of the first mold is inserted from the through hole having the large opening diameter of the guide plate, and the core rod can be fit into the center hole of the laminated iron core while guiding the core rod by the inner surface of the through hole of the guide plate. Therefore, when fitting the laminated iron core into the first mold, it is possible to insert and fit the core rod into the center hole of the laminated iron core easier in a more secured manner with better precision than before, and thus, it is possible to achieve improved productivity and improved quality of the rotor core.

DETAILED DESCRIPTION OF THE INVENTION

Hereinafter, with reference to FIGS. 1 to 3, a description will be given of a device for manufacturing a rotor core, a method for manufacturing a rotor core, and a rotor structure.

Figure 1:
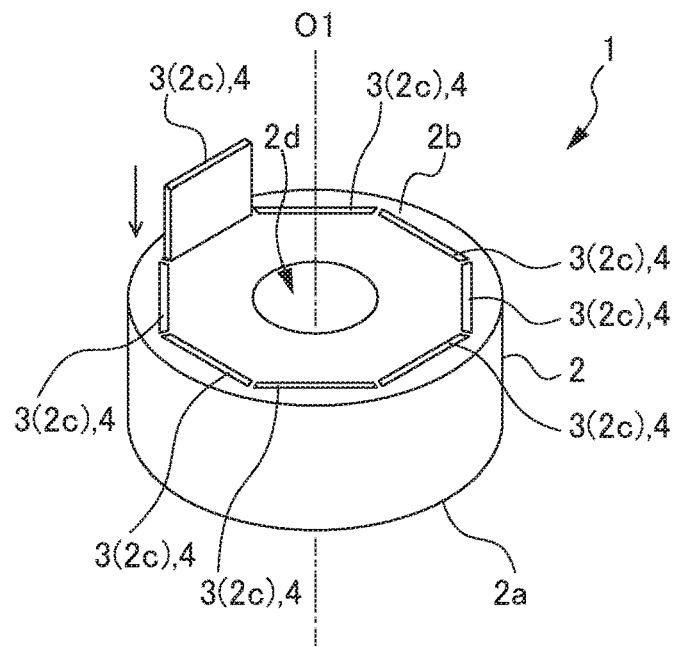
FIG. 1 is a perspective view showing a rotor core (an IPM-type rotor core) of one embodiment.
Figure 2:
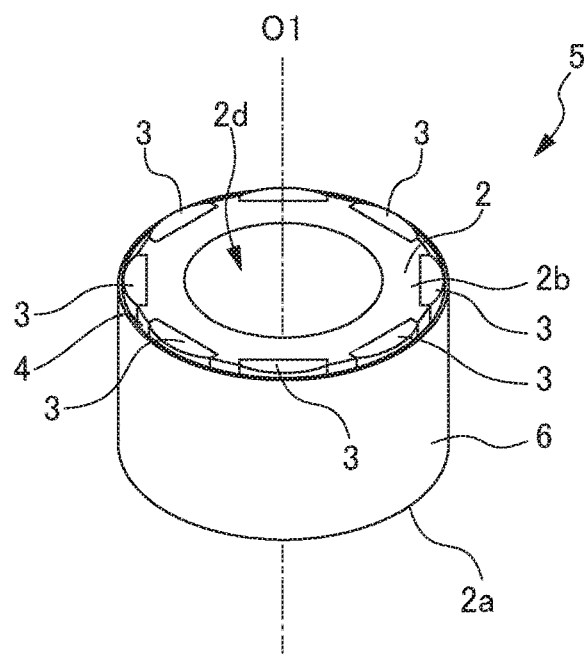
FIG. 2 is a perspective view showing a rotor core (an SPM-type rotor core) of one embodiment.

Here, as shown in FIGS. 1 and 2, rotor cores 1 and 5 of the present embodiment configure a rotor of an electric rotating machine such as a motor of a machine tool, an industrial robot, and other industrial machines, by inserting a shaft into a center hole (shaft hole) 2d that is formed to penetrate with an axis line O1 as a center and integrally mounting the rotor cores on the same axis with the shaft.

In the present embodiment, the rotor core 1 will be described as an IPM-type rotor core (interior permanent magnet type rotor core).

Figure 3:
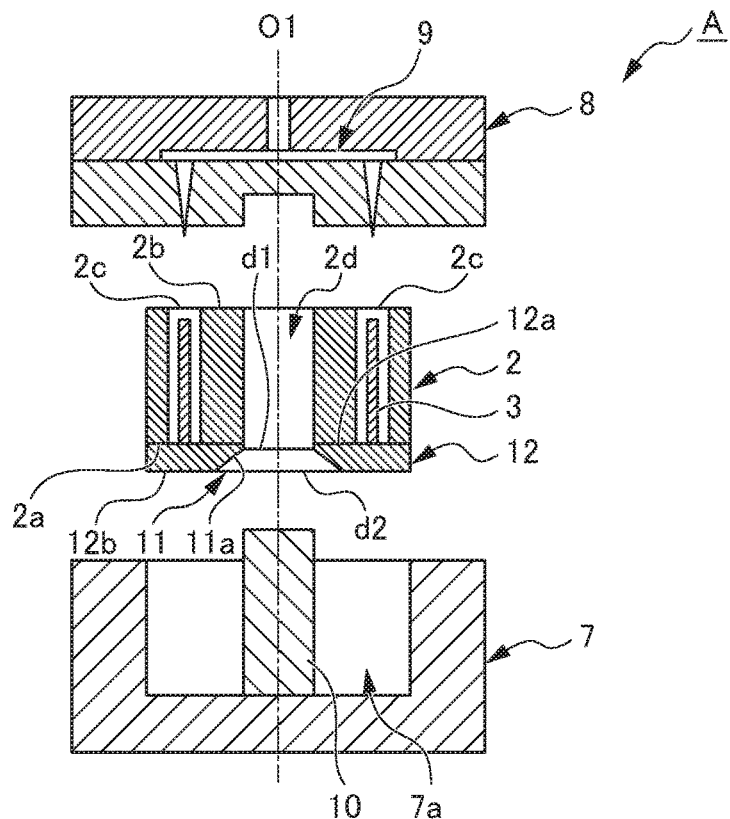
FIG. 3 is a cross-sectional view showing a manufacturing device and a manufacturing method for a rotor core (an IPM-type rotor core) of one embodiment.
Figure 4:
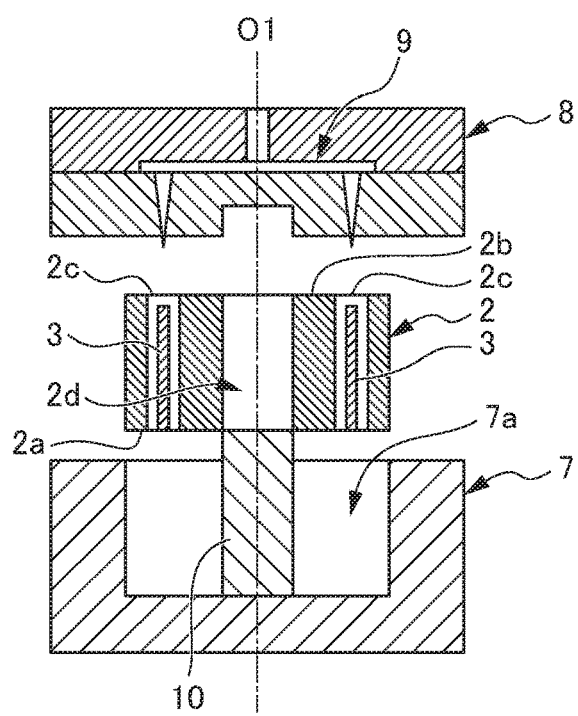
FIG. 4 is a cross-sectional view showing a manufacturing device and a manufacturing method for a conventional rotor core (an IPM-type rotor core)
Figure 5:
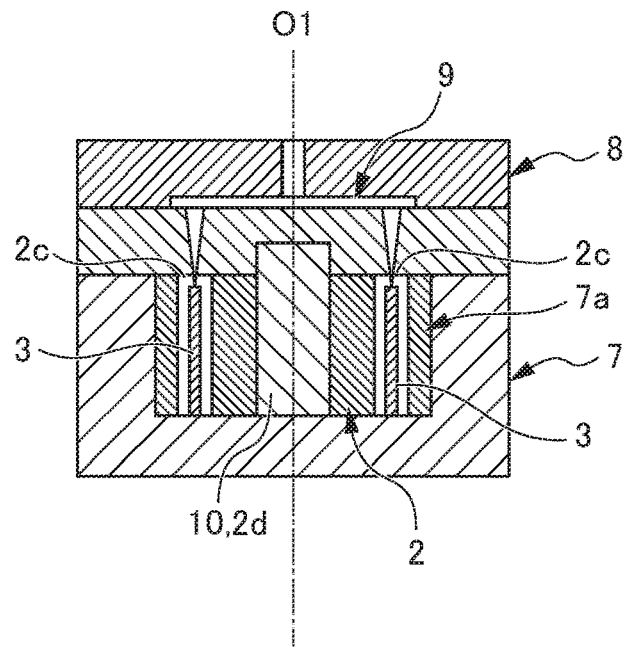
FIG. 5 is a cross-sectional view showing a manufacturing device and a manufacturing method for a conventional rotor core (an IPM-type rotor core)
Figure 6:
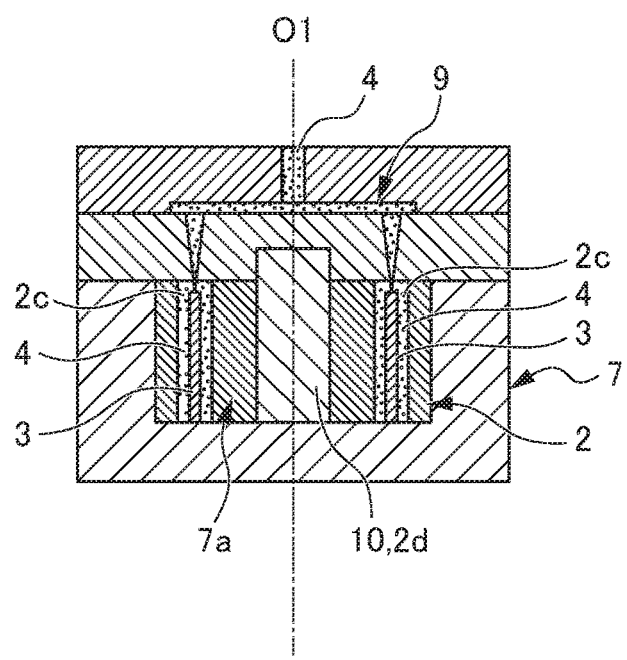
FIG. 6 is a cross-sectional view showing a manufacturing device and a manufacturing method for a conventional rotor core (an IPM-type rotor core)
Figure 7:
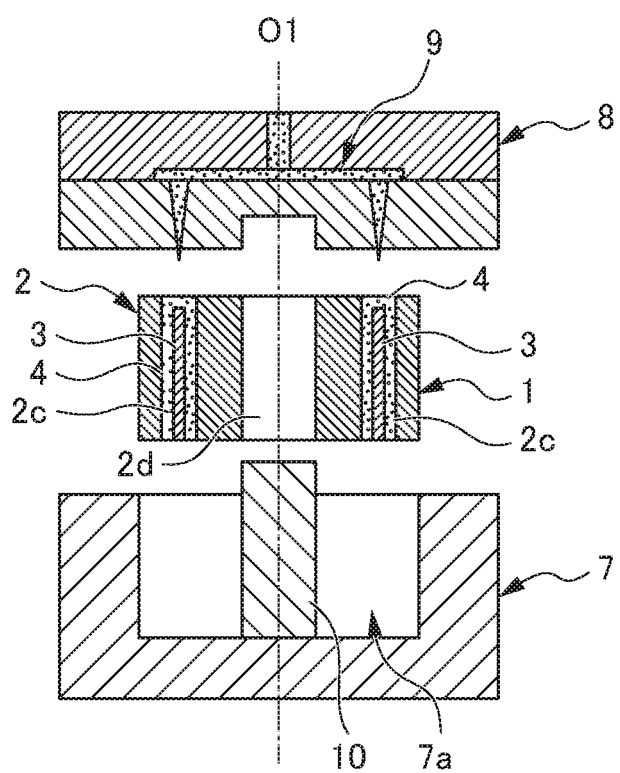
FIG. 7 is a cross-sectional view showing a manufacturing device and a manufacturing method for a conventional rotor core (an IPM-type rotor core)

For example, as shown in FIGS. 1 and 3, the rotor core 1 of the present embodiment includes: a laminated iron core (core) 2 in which a plurality of core members (thin plate-shaped members) formed by punching an electromagnetic steel sheet is laminated; permanent magnets (magnets) 3 that are each inserted into and arranged in a magnet insertion hole 2c formed to penetrate from one end 2a to the other end 2b in an axis line O1 direction of the laminated iron core 2; and a resin material 4 for embedding and fixing the permanent magnet 3 by injecting the resin material 4 into the magnet insertion hole 2c.

As illustrated in FIG. 3, a device A for manufacturing the rotor core 1 (a manufacturing device for a rotor core) of the present embodiment including the abovementioned configuration includes: a first mold 7 having a fitting recess 7a that fits and holds the laminated iron core 2 in which the permanent magnet 3 is inserted into the magnet insertion hole 2c, and a columnar core rod 10 that is fit in the center hole 2d formed to penetrate in the axis line O1 of the laminated iron core 2; a second mold 8 that is engaged with the first mold 7 and clamps and seals the laminated iron core 2 together with the first mold 7; a resin injection unit 9 that is provided to the second mold 8 and injects a resin material 4 in the magnet insertion hole 2c by using an injection molding machine; and a guide plate 12 that has a through hole 11 into which the core rod 10 is inserted with the axis line O1 as a center and is detachably mounted at the one end 2a in the axis line O1 direction on the first mold 7 side of the laminated iron core 2 in such a manner that the through hole 11 is in communication with the center hole 2d.

The guide plate 12 is, for example, formed in a circular plate shape and a ring shape. An opening diameter d1 of the through hole 11 on one surface 12a side on the one end 2a side of the laminated iron core 2 formed at the center of the guide plate 12 has the same diameter as the center hole 2d. An opening diameter d2 of the through hole 11 on the other surface 12b side on the first mold. 7 side is larger than the opening diameter d1 on the one surface 12a side.

Furthermore, the guide plate 12 of the present embodiment is formed to include, on the inner surface of the through hole 11, a guide surface 11a of which the diameter gradually becomes larger as it approaches the other surface 12b side from the one surface 12a side toward in the axis line O1 direction. This guide surface 11a is, for example, formed by chamfering a peripheral edge on the other surface 12b side, performing R finishing, performing tapering, etc.

A pin (not shown) that protrudes from the one surface 12a outwardly in the axis line O1 direction is provided at a predetermined location on the one surface 12a side of the guide plate 12. Furthermore, by fitting the pin into a hole (not shown) formed in advance to be recessed in the axis line O1 direction at a predetermined location on the one end 2a side of the laminated iron core 2, the guide plate 12 is positioned and detachably mounted at a predetermined location of the one end 2a of the laminated iron core 2.

The resin material 4 is delivered to the resin injection unit 9 provided to the second mold. 8 from an injection molding machine, and the resin injection unit 9 includes a resin flow channel through which the resin material 4 is delivered and injected to the magnet insertion hole 2c of the laminated iron core 2 clamped by the first mold (and the second mold 8.

Next, a description will be given of a method for manufacturing a rotor core 1 by using a manufacturing device A for the rotor core 1 of the present embodiment including the above configuration (a method for integrally embedding and fixing the permanent magnet 3 to the laminated iron core 2 by injecting the resin material 4).

First, the pin is fit into the hole at the one end 2a of the laminated iron core 2 in which the permanent magnet 3 is inserted into the magnet insertion hole 2c, and the guide plate 12 is detachably mounted in such a manner that the through hole 11 is in communication with the center hole 2d (guide plate mounting step).

Next, while inserting the core rod 10 of the first mold 7 into the center hole 2d of the laminated iron core 2 from the through hole 11 of the guide plate 12, the laminated iron core 2 (and the guide plate 12) is fit and arranged in the fitting recess 7a of the first mold 7 (first mold mounting step).

Next, the second mold. 8 is engaged with the first mold 7, and the laminated iron core 2 is clamped and sealed together with the first mold. 7 (second mold mounting step).

Thereafter, the resin material 4 is injected into the magnet insertion hole 2c through the resin injection unit 9 provided to the second mold 8 by an injection molding machine (resin injecting step), and the molds 7 and 8 are opened at the appropriate timing, and the rotor core 1 is removed by form removal. At the same time, the guide plate 12 is removed from the rotor core 1. The rotor core 1 in which the permanent magnet 3 inserted into the magnet insertion hole 2c is embedded and fixed with the resin material 4 thereby manufactured. It should be noted that the guide plate 12 is adopted to manufacture another rotor core 1.

On the other hand, in the manufacturing device A of the rotor core 1 and the manufacturing method of the rotor core 1 of the present embodiment, the opening diameter d1 of the through hole 11 on the one surface 12a side has substantially the same diameter as the center hole 2d, and the guide plate 12 having the opening diameter d2 on the other surface 12b side which is larger than the opening diameter d1 of the through hole 11 on the one surface 12a side and including the guide surface 11a on the inner surface is mounted on the one end 2a side of the laminated iron core 2 in advance.

The core rod 10 of the first mold 7 is inserted from the one surface 12a side having the larger opening diameter d2 of the guide plate 12 of the through hole 11, and the core rod 10 can thereby be fit into the center hole 2d of the laminated iron core 2 while guiding the core rod 10 by the guide surface 11a which is the inner surface of the through hole 11 of the guide plate 12. In other words, when fitting the laminated iron core 2 into the fitting recess 7a of the first mold 7, it is possible to automatically guide the core rod 10 so that the respective axis lines O1 of the laminated iron core 2 and the center hole 2d are arranged on the same axis by means of the through hole 11 of the guide plate 12, in particular, by means of the guide surface 11a of the present embodiment, thereby making it possible to suitably fit the core rod 10 into the center hole 2d of the laminated iron core 2.

Therefore, according to the manufacturing device A of the rotor core 1 and the manufacturing method of the rotor core 1 of the present embodiment, when fitting the laminated iron core 2 into the first mold 7, it is possible to insert and fit the core rod 10 into the center hole 2d of the laminated iron core 2 in an easier and more secure manner with better precision than before, and thus, it is possible to achieve improved productivity and improved quality of the rotor core 1.

An embodiment of the manufacturing device for a rotor core and manufacturing method for a rotor core have been explained above; however, the present invention is not limited to the embodiment described above, and can be modified within a scope that does not deviate from the gist of the present invention.

For example, the resin injection unit 9 is provided to the second mold 8 in the present embodiment. However, the resin injection unit 9 may be provided to the first mold 7.

For example, in the present embodiment, the rotor core has been described as an IPM-type rotor core (interior permanent magnet type rotor core); however, it may be an SPM-type rotor core (surface permanent magnet type rotor core).

More specifically, for example, as shown in FIG. 2, the SPM-type rotor core 5 is configured to include the laminated iron core 2, the permanent magnets 3 which are arranged at equal intervals in the circumferential direction on the outer peripheral surface side of the laminated iron core 2, the cylindrical exterior member 6 which surrounds and covers the laminated iron core 2 with the permanent magnets 3, and the resin material 4 for embedding and fixing the permanent magnets 3 by injecting the resin material 4 between the exterior member 6 and the laminated iron core 2.

When manufacturing this SPM-type rotor core 5, the guide plate 12 is mounted to the laminated iron core 2 to which the magnets 3 and the exterior member 6 are attached, and the resultant component in this state is fit into the fitting recess 7a of the first mold 7, engaged with the second mold 8, and clamped. Thereafter, using a molding machine, a resin material is injected between the exterior member 6 and the laminated iron core 2 from the resin injection unit 9, and the magnets 3 are embedded and fixed.

In such a case as well, by using the guide plate 12 similarly to that of the present embodiment, it is possible to obtain the same operational effect as that of the present embodiment.

EXPLANATION OF REFERENCE NUMERALS

1 IPM type rotor core (rotor core)
2 laminated iron core
2a one end
2b other end
2c magnet insertion hole
2d center hole (shaft hole)
3 permanent magnet (magnet)
4 resin material
5 SPM-type rotor core (rotor core)
6 exterior member
7 first mold
7a fitting recess
8 second mold
9 resin injection unit
10 core rod
11 through hole
11a guiding surface
12 guide plate
A manufacturing device for rotor core
d1 opening diameter of through hole
D2 opening diameter of through hole
O1 axis line

What is claimed is:

1. A device for manufacturing a rotor core, the device comprising:
    a first mold including: a fitting recess that fits and holds a laminated iron core in which a magnet is inserted into a magnet insertion hole, or a laminated iron core in which a magnet and an exterior member are mounted on an outer circumferential side, and a columnar core rod that is fit into a center hole that is formed to penetrate in an axis line direction of the laminated iron core;

a second mold that engages with the first mold and clamps and seals the laminated iron core together with the first mold;

a resin injection unit that is provided to the first mold or the second mold and injects a resin material in the magnet insertion hole or between the exterior member and the laminated iron core by using a molding machine; and a guide plate that has a through hole into which the core rod is inserted with an axis line as a center, the guide plate being detachably mounted to the laminated iron core at one end in an axis line direction on a side of the first mold of the laminated iron core in such a manner that the through hole is in communication with the center hole, wherein the guide plate has an opening diameter of the through hole on one surface side of one end side of the laminated iron core that is substantially the same as an opening diameter of the center hole, and an opening diameter of the through hole on an other surface side on the side of the first mold is larger than an opening diameter on the one surface side, and wherein the through hole of the guide plate is formed to include, on an inner surface of the through hole, a guide surface of which a diameter gradually becomes larger approaching the other surface side from the one surface side in the axis line direction, such that when the core rod is inserted into the through hole the core rod is guided into the center hole of the of the iron core by the guide surface.

2. The device for manufacturing the rotor core according to claim 1, wherein the through hole of the guide plate is formed by chamfering a peripheral edge on the side of the other surface.

3. A method for manufacturing a rotor core, the method comprising:

a guide plate mounting step of detachably mounting a guide plate to a laminated iron core, the guide plate having a through hole, with an axis line as a center, at one end in an axis line direction of the laminated iron core in which a magnet is inserted into a magnet insertion hole or in which a magnet and an exterior member are mounted on an outer circumferential side in such a manner that the through hole is in communication with a center hole that is formed to penetrate in an axis line direction of the laminated iron core;

a first mold mounting step of inserting a columnar rod-shaped core rod provided to the first mold into a center hole of the laminated iron core from the through hole of the guide plate in a fitting recess of the first mold, and fitting and arranging the laminated iron core;

a second mold mounting step of engaging the second mold with the first mold, and clamping and sealing the laminated iron core together with the first mold; and a resin injecting step of injecting a resin material into the magnet insertion hole or between the exterior member and the laminated iron core, through a resin injection unit provided to the first mold or the second mold, wherein the guide plate has an opening diameter of the through hole on one surface side of one end side of the laminated iron core that is substantially the same as an opening diameter of the center hole, and an opening diameter of the through hole on an other surface side on a side of the first mold is larger than an opening diameter on the one surface side, wherein the through hole of the guide plate is formed to include, on an inner surface of the through hole, a guide surface of which a diameter gradually becomes larger approaching the other surface side from the one surface in the axis line direction, and in the first mold mounting step, the core rod is inserted into the through hole while guided by the guide surface of the inner surface of the through hole.

* * * * *